（12） United States Patent
Komori et al.

(10) Patent No.: US 7,367,320 B2
(45) Date of Patent: May 6, 2008

(54) FUEL CONTROL SYSTEM FOR INTERNAL COMBUSTION ENGINE

(75) Inventors: Takafumi Komori, Wako (JP); Naoki Oie, Wako (JP); Ryuji Kohno, Wako (JP); Hirofumi Hara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/710,484

(22) Filed: Feb. 26, 2007

(65) Prior Publication Data

US 2007/0215118 A1    Sep. 20, 2007

(30) Foreign Application Priority Data

Mar. 20, 2006   (JP)   ............... 2006-076591

(51) Int. Cl.
*F02B 37/00*   (2006.01)
*F02M 51/00*   (2006.01)
*F02B 23/00*   (2006.01)

(52) U.S. Cl. ............. 123/445; 123/478; 123/585

(58) Field of Classification Search ........... 123/445, 123/478, 480, 585, 492; 60/39.281
See application file for complete search history.

(56) References Cited

U.S. PATENT DOCUMENTS 3,922,850 A * 12/1975 McCabe .............. 60/39.281
4,432,201 A *  2/1984 Hawes .................... 60/792
6,813,875 B2 * 11/2004 Inoue ................. 60/39.281

FOREIGN PATENT DOCUMENTS

JP       08-061073 A       3/1996

* cited by examiner

*Primary Examiner*—Hieu T. Vo
(74) *Attorney, Agent, or Firm*—Arent Fox LLP

(57) ABSTRACT

A fuel control system for an internal combustion engine having an intake passage, a compressor provided in the intake passage, a throttle valve disposed downstream of the compressor, a bypass passage connecting an upstream side of the compressor to a downstream side of the compressor, and an air bypass valve provided in the bypass passage. An intake air flow rate of the engine is calculated based on the engine rotational speed and the intake pressure, which are detected when the air bypass valve is determined to be in the opening operation state. An amount of fuel supplied to the engine is then controlled according to the calculated intake air flow rate.

12 Claims, 13 Drawing Sheets

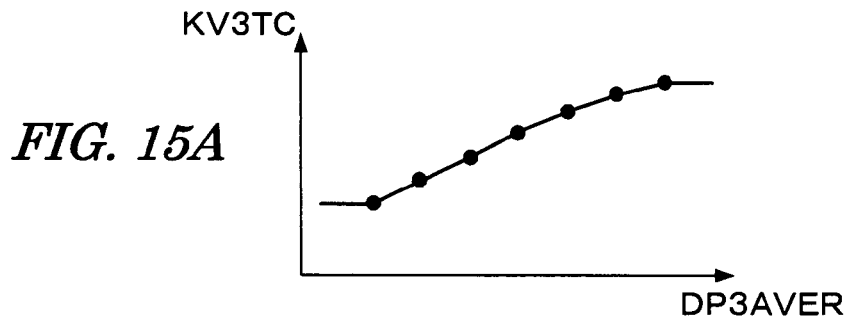
*FIG. 15A*
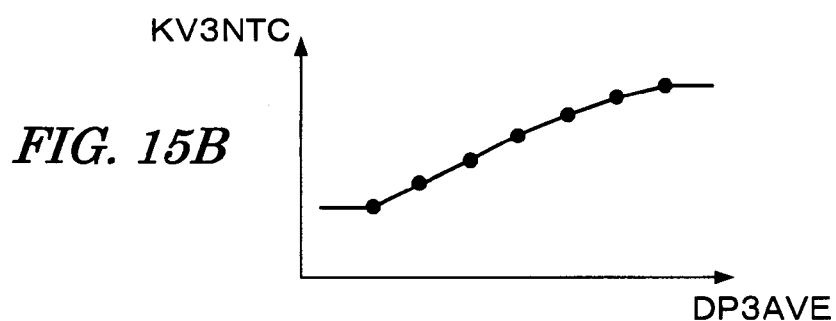
*FIG. 15B*
*FIG. 16*
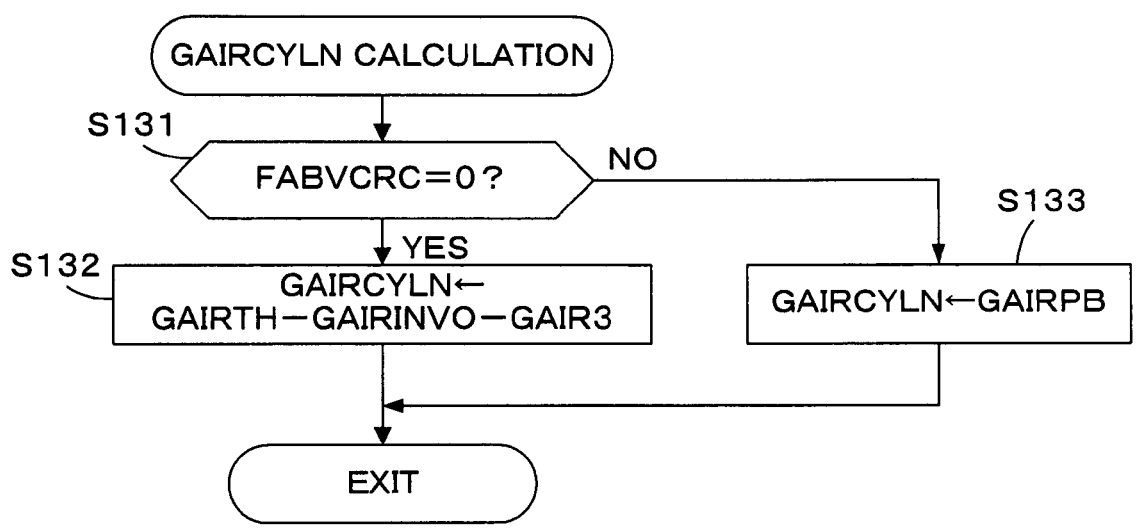

FUEL CONTROL SYSTEM FOR INTERNAL COMBUSTION ENGINE

BACKGROUND OF THE INVENTION

1. Field of the Invention

The present invention relates to a fuel control system for an internal combustion engine and, particularly, to a fuel control system for an internal combustion engine having a turbocharger, a bypass passage bypassing a compressor of the turbocharger, and an air bypass valve for opening and closing the bypass passage.

2. Description of the Related Art

Japanese Patent Laid-open No. H08-61073 discloses a turbocharging device for an internal combustion engine having a compressor for pressurizing intake air, a bypass passage for bypassing the compressor, and an air bypass valve for opening and closing the bypass passage. According to the device, the air bypass valve opens when the throttle valve is closed, and a portion of the intake air is recirculated to the upstream side of the compressor. The recirculation of the intake air reduces a rotating load of the compressor and increases the intake air flow rate to prevent the surging.

In the condition where the air bypass valve opens and the intake air passing through the compressor is recirculated to the upstream side of the compressor, the intake air flow rate detected by an intake air flow rate sensor on the upstream side of the region in which the bypass passage opens to the intake air passage may pulsate depending on a relationship between a timing at which the throttle valve closes and a timing at which the air bypass valve opens corresponding to the closing operation of the throttle valve. Further, since the intake air is recirculated, the flow rate of air actually supplied to the combustion chamber differs from the output of the intake air flow rate sensor. The amount of fuel supplied to the engine is usually calculated according to the output of the intake air flow rate sensor. However, if the fuel amount supply is calculated according to the output of the intake air flow rate sensor in the condition where the air bypass valve opens and the intake air passing through the compressor is recirculated to the upstream side of the compressor, the air-fuel ratio in the combustion chamber may deviate from a desired value, wherein the exhaust characteristics of the engine degrade.

SUMMARY OF THE INVENTION

The present invention was attained while contemplating the above-described matter, and an aspect of the present invention is to provide a fuel control system for an internal combustion engine which estimates the intake air flow rate of the internal combustion engine, which has the bypass passage bypassing the compressor of the turbocharger and the air bypass valve, with sufficient accuracy and appropriately controls the air-fuel ratio to maintain good exhaust characteristics.

In order to attain the above aspect, the present invention provides a fuel control system for an internal combustion engine having an intake passage, a compressor provided in the intake passage, a throttle valve disposed downstream of the compressor, a bypass passage communicating with an upstream side and a downstream side of the compressor, and an air bypass valve provided in the bypass passage. The fuel control system includes intake pressure detection means, rotational speed detecting means, opening operation state determining means, intake air flow rate calculating means, and fuel amount control means. The intake pressure detection means detects an intake pressure (PBA) on the downstream side of the throttle valve, and the rotational speed detecting means detects a rotational speed (NE) of the engine. The opening operation state determining means determines an opening operation state of the air bypass valve. The intake air flow rate calculating means calculates an intake air flow rate (GAIRCYLN) of the engine, based on the engine rotational speed (NE) and the intake pressure (PBA), which are detected when the air bypass valve is in the opening operation state. The fuel amount control means controls an amount (TOUT) of fuel supplied to the engine according to the calculated intake air flow rate (GAIRCYLN).

With the above-described structural configuration, when the air bypass valve is in the opening operation state, the intake air flow rate of the engine is calculated based on the detected engine rotational speed (NE) and the intake pressure (PBA), and the amount of fuel supplied to the engine is controlled according to the calculated intake air flow rate. Therefore, an accurate amount of fuel, according to an accurate value of the intake air flow rate, is supplied to the engine. Consequently, the air-fuel ratio in the combustion chamber is appropriately controlled to maintain good exhaust characteristics.

Preferably, the opening operation state determining means includes boost pressure detecting means for detecting a boost pressure (P3TC) on the downstream side of the compressor and atmospheric pressure detecting means for detecting an atmospheric pressure (PA). The opening operation state determining means determines that the air bypass valve is in the opening operation state when the air bypass valve is in a condition of being able to open, and a pressure difference between the boost pressure (P3TC) and the atmospheric pressure (PA) is equal to or greater than a predetermined pressure (PABVCRCG).

With the above-described structural configuration, the air bypass valve is determined to be in the opening operation state when the air bypass valve is in a condition of being able to open and the pressure difference between the boost pressure and the atmospheric pressure is equal to or greater than the predetermined pressure. Accordingly, control using the intake air flow rate calculated based on the engine rotational speed and the intake pressure is performed in the opening operation state where air is confirmed as being recirculated through the bypass passage. That is, the state where the detected intake air flow may produce an incorrect value, is accurately detected, and the control using the detected intake air flow rate is switched at an appropriate time to the control using the intake air flow rate calculated based on the engine rotational speed and the intake pressure.

Preferably, the fuel control system further includes air flow rate detecting means for detecting an intake air flow rate on the upstream side of a connecting portion at which the bypassing passage is connected to the intake passage on the upstream side of the compressor, wherein the intake air flow rate calculating means calculates the intake air flow rate (GAIRCYLN) of the engine according to the intake air flow rate (VGAIRX) detected by the intake air flow rate detecting means when the air bypass valve is not in the opening operation state.

With the above-described structural configuration, when the air bypass valve is not in the opening operation state, the intake air flow rate of the engine is calculated according to the intake air flow rate detected by the intake air flow rate detecting means. Therefore, in the operating condition where the detected intake air flow rate indicates a correct value, the air-fuel ratio control is accurately performed by using the directly detected intake air flow rate.

Preferably, when the air bypass valve is not in the opening operation state, the intake air flow rate calculating means calculates a first correction air flow rate (GAIR3) and a second correction air flow rate (GAIRINVO) and corrects the intake air flow rate (VGAIRX) detected by the intake air flow rate detecting means with the first and second correction air flow rates (GAIR3, GAIRINVO) to calculate the intake air flow rate (GAIRCYLN) of the engine. The first correction air flow rate (GAIR3) is a flow rate of air flowing into a region of the intake passage downstream of the compressor and upstream of the throttle valve. The second correction air flow rate (GAIRINVO) is a flow rate of air flowing into a region of the intake passage downstream of the throttle valve.

Preferably, the fuel supply control system further includes transient state determining means for determining a transient sate of the engine, wherein the intake air flow rate calculating means uses the detected intake pressure (PBA) when the engine is determined to be in the transient state, and the intake air flow rate calculating means uses an averaged intake pressure (PBAVE) calculated by averaging the detected intake pressure when the engine is not determined to be in the transient state.

Preferably, the transient state determining means includes intake pressure change amount calculating means for calculating an intake pressure change amount (DPBA) of the detected intake pressure (PBA), and second order intake pressure change amount calculating means for calculating a second order change amount (DDPBA) of the intake pressure change amount (DPBA). The transient state determining means performs the transient state determination by comparing the intake pressure change amount (DPBA) and the second order intake pressure change amount (DDPBA), respectively, with corresponding determination threshold values (DPBAVE2, DDPBAVE2).

BRIEF DESCRIPTION OF THE DRAWINGS

FIGS. 15A and 15B show tables referred to in the process of FIG. 14;

FIG. 16 is a flowchart of a process for calculating the cylinder intake air flow rate (GAIRCYLN);

DETAILED DESCRIPTION OF THE PREFERRED EMBODIMENTS

Preferred embodiments of the present invention will now be described with reference to the drawings.

Figure 1:
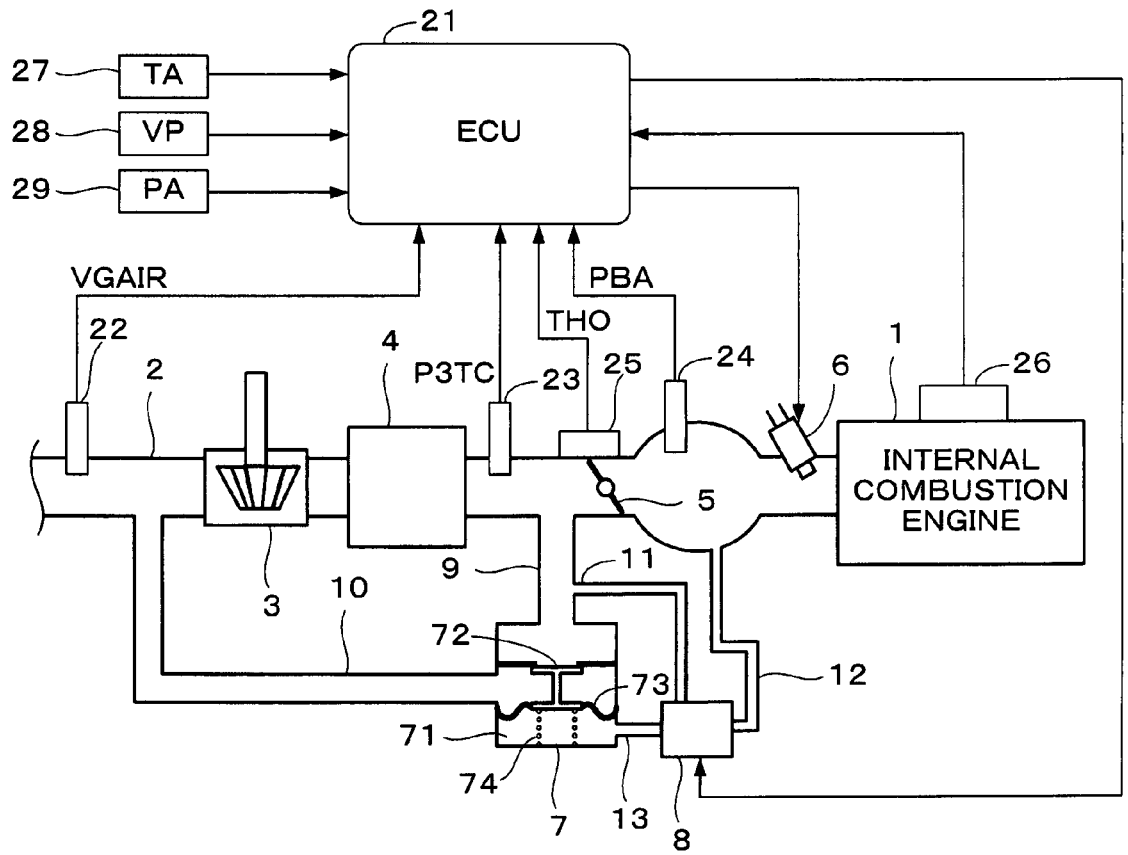
FIG. 1 is a schematic diagram of an internal combustion engine and a control system according to one embodiment of the present invention.

FIG. 1 is a schematic diagram showing a configuration of an internal combustion engine and a control system according to one embodiment of the present invention. The internal combustion engine 1 (hereinafter referred to as "engine") has four cylinders and an intake pipe 2. The intake pipe 2 is provided with a compressor 3 of a turbocharger, an intercooler 4, a throttle valve 5, and a fuel injection valve 6 in sequential order relative to the upstream side. The compressor 3 is rotationally driven by a turbine (not shown) and pressurizes the intake air of the engine 1. The intercooler 4 cools the pressurized air. The throttle valve 5 is actuated by an actuating device (not shown) according to a depressed amount of an accelerator of the vehicle driven by the engine 1. The fuel injection valve 6 is provided corresponding to each cylinder of the engine 1. The fuel injection valve 6 is connected to an electronic control unit 21 (hereinafter referred to as "ECU"), and a valve opening period of the fuel injection valve 6 is controlled by the ECU 21.

The intake pipe 2 is connected to a bypass passage 9 at a portion downstream of the intercooler 4 and upstream of the throttle valve 5. The bypass passage 9 is connected to a bypass passage 10 through an air bypass valve 7. The bypass passage 10 is connected to the intake pipe 2 at a portion upstream of the compressor 3.

The air bypass valve 7 is provided with a diaphragm 73, a valve body 72 mounted on the diaphragm 73, a pressure chamber 71 defined by the diaphragm 73, and a spring 74 for biasing the valve body 72 in a closing direction. The pressure chamber 71 is connected to a switching valve 8 through a passage 13. A pressure P3TC (hereinafter referred to as "boost pressure") in an upstream portion of the throttle valve 5 is supplied to the switching valve 8 through a passage 11, and a pressure PBA (hereinafter referred to as "intake pressure") in a downstream portion of the throttle valve 5 is supplied to the switching valve 8 through a passage 12. The switching valve 8 is an electromagnetic valve having a solenoid, and the solenoid is connected to the ECU 21. The switching valve 8 is controlled by a driving control signal supplied from the ECU 21 to perform a switching operation in which either the boost pressure P3TC or the intake pressure PBA is supplied to the pressure chamber 71 of the air bypass valve 7. In the explanation provided below, a condition where the boost pressure P3TC is supplied to the pressure chamber 71 will be referred to as "valve opening disabling condition", and a condition where the intake pressure PBA is supplied to the pressure chamber 71 will be referred to as "valve opening enabling condition".

Figure 2:
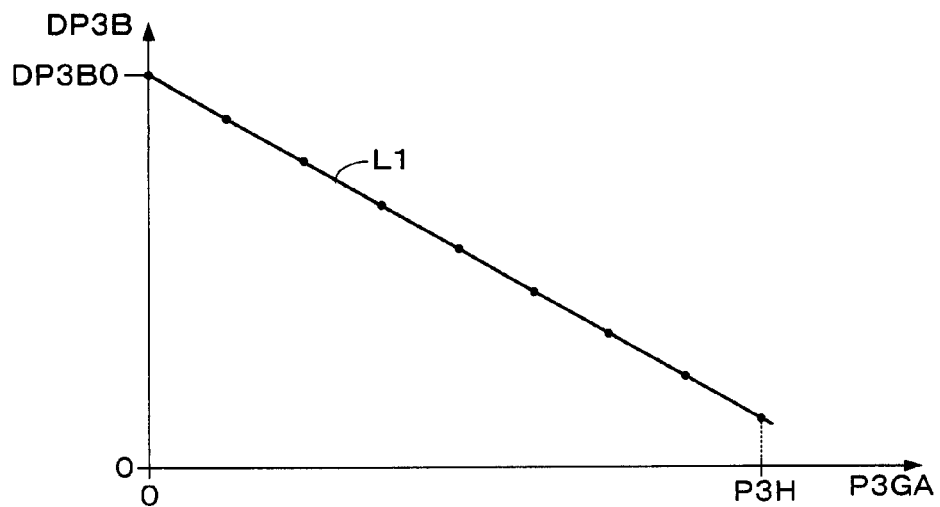
FIG. 2 is a graph illustrating an operational characteristic of an air bypass valve.

FIG. 2 is a graph for illustrating operation of the air bypass valve 7. In FIG. 2, the horizontal axis represents the gage pressure P3GA (=the boost pressure P3TC−the atmospheric pressure PA), and the vertical axis represents a pressure difference DP3B (=P3TC−PBA) between the boost pressure P3TC and the intake pressure PBA. The air bypass valve 7 opens when the intake pressure PBA is supplied to the pressure chamber 71 and the pressure difference DP3B is greater than a valve opening threshold value corresponding to the straight line L1. The boost pressure P3H shown in FIG. 2 is, for example, 107 kPa (800 mmHg), and the pressure difference DP3B0 is, for example, 43.9 kPa (330 mmHg). In the condition where the intake pressure PBA is supplied to the pressure chamber 71, the air bypass valve 7 maintains a closed state.

An intake air flow rate sensor 22 is provided in the intake pipe 2 upstream of the portion connected to the bypass passage 10, and a detection signal VGAIR of the sensor 22 is supplied to the ECU 21. Further, the intake pipe 2 is provided with a boost pressure sensor 23 for detecting the boost pressure P3TC and an intake pressure sensor 24 for detecting the intake pressure PBA. Further, the throttle valve 5 is provided with a throttle valve opening sensor 25 for detecting an opening THO of the throttle valve 5. The detection signals of sensors 22-25 are supplied to the ECU 21.

A crank angle position sensor 26 for detecting a rotation angle of a crankshaft (not shown) of the engine 1 is connected to the ECU 21. A signal corresponding to a detected rotation angle of the crankshaft is supplied to the ECU 21. The crank angle position sensor 26 includes a cylinder discrimination sensor which outputs a pulse (hereinafter referred to as "CYL pulse") at a predetermined crank angle position for a specific cylinder of the engine 1. The crank angle position sensor 26 also includes a top dead center (TDC) sensor, which outputs a TDC pulse at a crank angle position before a TDC of a predetermined crank angle starts at an intake stroke in each cylinder (i.e., at every 180° crank angle in the case of a four-cylinder engine), and a crank angle (CRK) sensor for generating one pulse (hereinafter referred to as "CRK pulse") in a constant crank angle period (e.g., a period of 30°, which is shorter than the period of generation of the TDC pulse). The CYL pulse, the TDC pulse and the CRK pulse are supplied to the ECU 21. The CYL, TDC and CRK pulses are used for controlling various timings, such as a fuel injection timing and an ignition timing, and detecting an engine rotational speed NE.

An intake air temperature sensor 27 for detecting an intake air temperature TA of the engine 1, a vehicle speed sensor 28 for detecting a running speed (vehicle speed) VP of the vehicle driven by the engine 1, an atmospheric pressure sensor 29 for detecting the atmospheric pressure PA, and various other sensors, for example, an engine coolant temperature sensor, an air-fuel ratio sensor, etc., which are not shown, are connected to the ECU 21. The detection signals of the sensors 27-29 are supplied to the ECU 21.

The ECU 21 includes an input circuit, a central processing unit (hereinafter referred to as "CPU"), a memory circuit, and an output circuit. The input circuit performs various functions, including shaping the waveforms of input signals from various sensors, correcting the voltage levels of the input signals to a predetermined level, and converting analog signal values into digital values. The memory circuit preliminarily stores various operating programs to be executed by the CPU and stores the results of computations, or the like, performed by the CPU. The output circuit supplies control signals to the switching valve 8, the fuel injection valves 6, and the like. The CPU in the ECU 21 calculates a flow rate GAIRCYLN (hereinafter referred to as "cylinder intake air flow rate") of air supplied to each cylinder of the engine 1 in a manner described below and calculates a valve opening period (fuel injection period) TOUT of the fuel injection valve 6 using equation (1).

$$TOUT = TIM \times KCMD \times KAF \times K1 + K2 \qquad (1)$$

TIM is a basic fuel injection amount which is set so that the air-fuel ratio coincides with the stoichiometric ratio according to the cylinder intake air flow rate GAIRCYLN.

KCMD is a target air-fuel ratio coefficient which is set according to engine operating parameters, such as the engine rotational speed NE, the intake pressure PBA, and the engine coolant temperature. The target air-fuel ratio coefficient KCMD is proportional to the reciprocal of an air-fuel ratio A/F, i.e., proportional to a fuel-air ratio F/A, and takes a value of "1.0" for the stoichiometric ratio. Therefore, the target air-fuel ratio coefficient KCMD is also referred to as a target equivalent ratio.

KAF is an air-fuel ratio correction coefficient that is calculated so that a detected equivalent ratio KACT, calculated from an air-fuel ratio detected by the air-fuel ratio sensor, coincides with the target equivalent ratio KCMD.

K1 and K2 are, respectively, a correction coefficient and a correction variable calculated according to various engine parameter signals. The correction coefficient K1 and the correction variable K2 are set to a predetermined value that optimizes various characteristics, such as fuel consumption characteristics and engine acceleration characteristics, according to the engine operating condition.

The CPU in the ECU 5 supplies a drive signal to the fuel injection valve 6 through the output circuit to open each fuel injection valve 6 according to the fuel injection period TOUT calculated in a manner described above.

Figure 3:
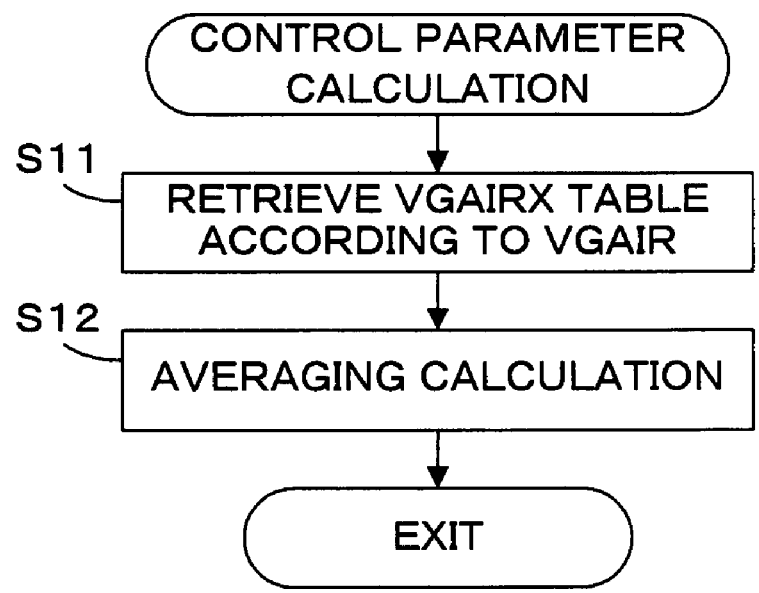
FIG. 3 is a flowchart of a process for calculating a control parameter according to a sensor output.

FIG. 3 is a flowchart of a process for calculating control parameters used in the process for calculating the cylinder intake air flow rate GAIRCYLN from the parameters detected by the above-described sensors. This process is executed by the CPU in the ECU 21 in synchronism with generation of the CRK pulse.

Figure 4:
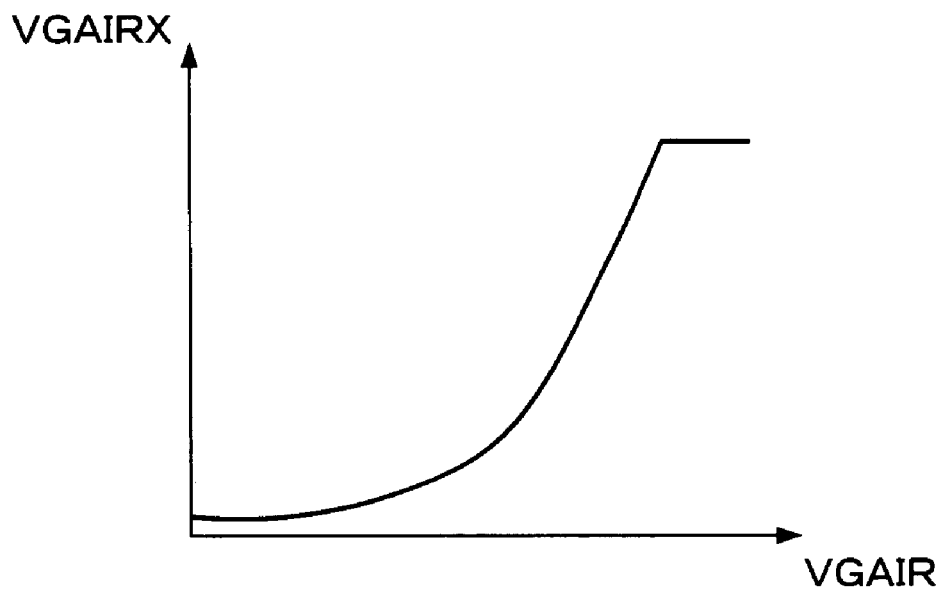
FIG. 4 shows a table referred to in the process of FIG. 3.

In step S11, a VGAIRX table shown in FIG. 4 is retrieved according to an output voltage VGAIR of the intake air flow rate sensor 22 to calculate an intake air flow rate VGAIRX [g/sec]. VGAIRX will be hereinafter referred to as "detected intake air flow rate."

In step S12, averaging calculations, for example, calculations of an average value of six data points sampled in synchronism with the CRK pulse, the detected intake air flow rate VGAIRX, the boost pressure P3TC, and the intake pressure PBA, are performed to calculate, respectively, an averaged intake air flow rate GAIRAVE0, an averaged boost pressure P3TCAVE, and an averaged intake pressure PBAVE.

Figure 5:
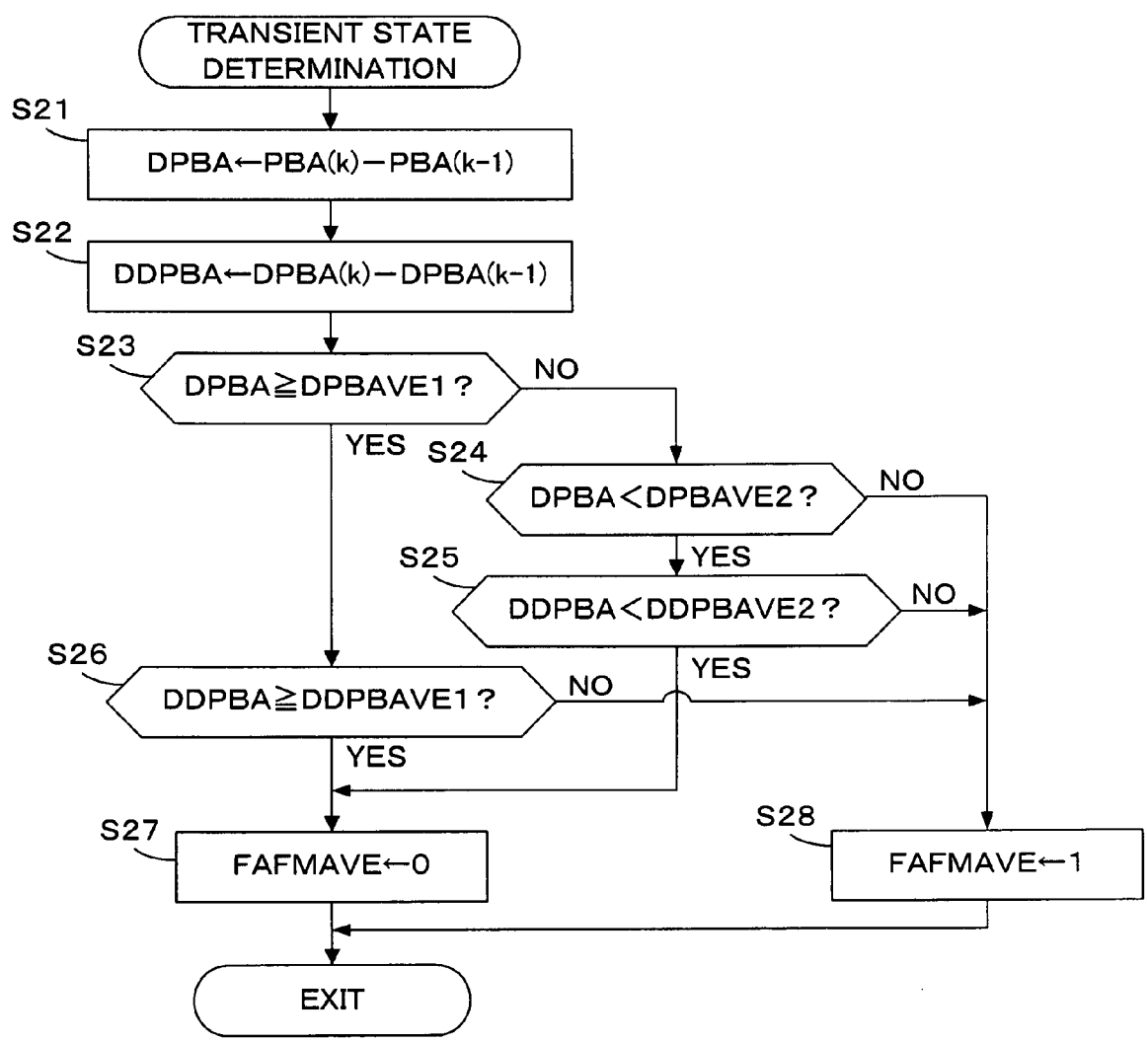
FIG. 5 is a flowchart of a process for determining the transient state of the engine operating condition.

FIG. 5 is a flowchart of a process for determining a transient state of the engine operation. The process is executed by the CPU in the ECU 21 in synchronism with generation of the TDC pulse.

In step S21, an intake pressure change amount DPBA is calculated by equation (2).

$$DPBA = PBA(k) - PBA(k-1) \qquad (2)$$

where k is a control time digitized with a generation period of the TDC pulse.

In step S22, a change amount DDPBA of the intake pressure change amount (hereinafter referred to as "second order change amount") is calculated by equation (3).

$$DDPBA = DPBA(k) - DPBA(k-1) \tag{3}$$

In step S23, it is determined whether the intake pressure change amount DPBA is greater than a first predetermined change amount DPBAVE1 (for example, 0.93 kPa (7 mmHg)). If the answer to step S23 is affirmative (YES), i.e., the engine 1 is accelerating, it is further determined whether the second order change amount DDPBA is greater than a first predetermined second order change amount DDPBAVE1 (for example, 0.13 kPa (1 mmHg)) (step S26). If the answer to step S26 is negative (NO), it is determined that the engine operation is not in the transient state, and a transient determination flag FAFMAVE is set to "1" (step S28).

In step S26, if DDPBA is equal to or greater than DDPBAVE1, it is determined that the engine operation is in the transient state, and the transient determination flag FAFMAVE is set to "0" (step S27).

In step S23, if DPBA is less than DPBAVE1, it is determined whether the intake pressure change amount DPBA is less than a second predetermined change amount DPBAVE2 (for example, −0.93 kPa (7 mmHg)) set to a negative value (step S24). If the answer to step S24 is affirmative (YES), i.e., the engine 1 is decelerating, it is further determined whether the second order change amount DDPBA is less than a second predetermined second order change amount DDPBAVE2 (for example, −0.13 kPa (1 mmHg)) set to a negative value (step S25). If the answer to step S24 or step S25 is negative (NO), it is determined that the engine operation is not in the transient state, and the process proceeds to step S28.

If the answer to step S25 is affirmative (YES), it is determined that the engine operation is in the transient state, and the process proceeds to step S27.

If the engine operation is determined to be in the transient state, the detected values (VGAIRX, PCTC, PBA), which are not averaged, are used in the process described below instead of the averaged values (GAIRAVE0, P3TCAVE, PBAVE) calculated by the averaging calculation.

Figure 6:
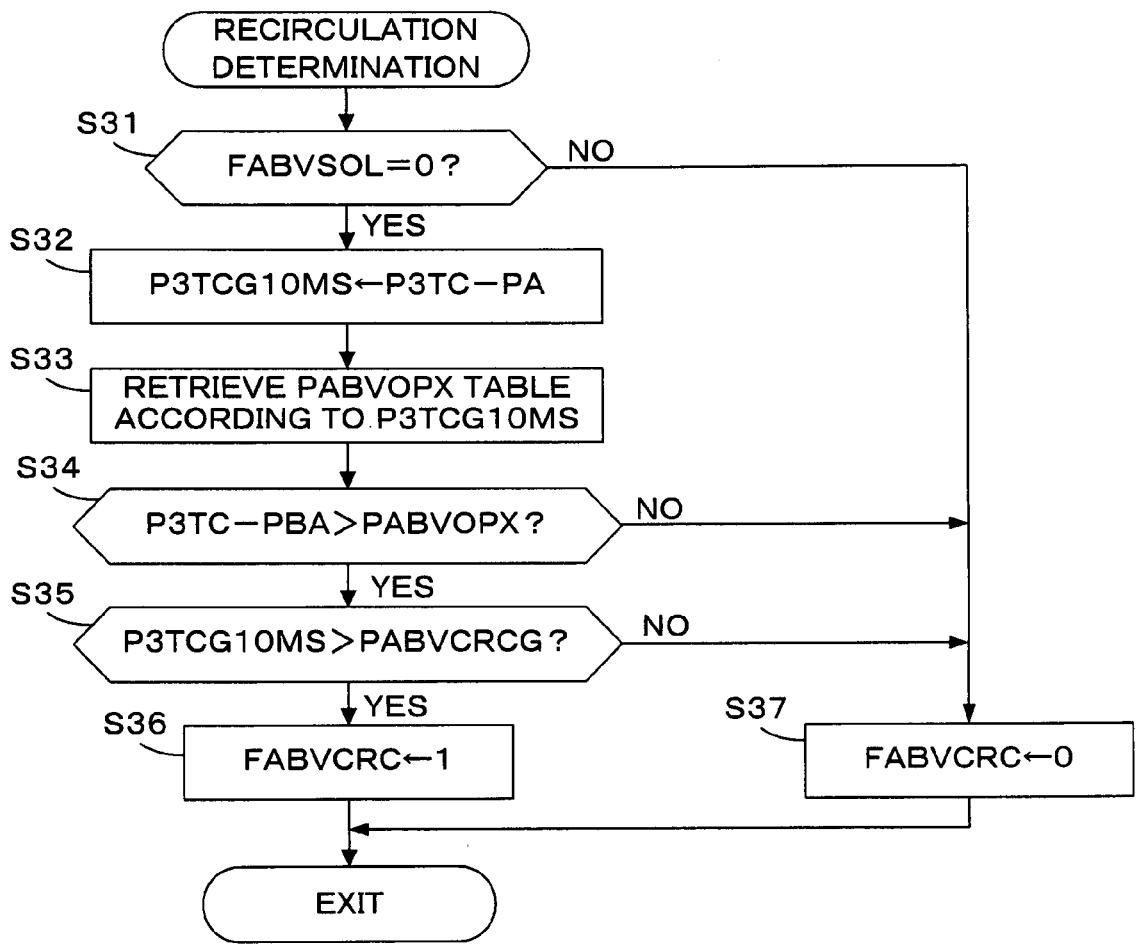
FIG. 6 is a flowchart of a process for determining the condition where recirculation of air through the air bypass valve is performed.

FIG. 6 is a flowchart of a process for determining a condition (hereinafter referred to as "air recirculating condition") where air is being recirculated through the air bypass valve 7 (bypass passages 9 and 10). The process is executed at predetermined time intervals (for example, 10 milliseconds) by the CPU in the ECU 21. The "air recirculating condition" corresponds to the "opening operating condition" of the air bypass valve 7.

In step S31, it is determined whether a switching valve flag FABVSOL is equal to "0". The switching valve flag FABVSOL is set to "0" when the switching valve 8 is controlled to be in the valve opening enabling condition in the process of FIG. 8 described below, and is set to "1" when the switching valve 8 is controlled to be in the valve opening disabling condition.

If the answer to step S31 is negative (NO), indicating that the switching valve 8 is controlled to be in the valve opening disabling condition, the air recirculating condition cannot be implemented. Accordingly, the recirculating condition flag FABVCRC is set to "0" (step S37).

If the answer to step S31 is affirmative (YES), indicating that the switching valve 8 is controlled to be in the valve opening enabling condition, a pressure difference P3TCG10MS is calculated by equation (4) (step S32).

$$P3TCG10MS = P3TC - PA \tag{4}$$

Figure 7:
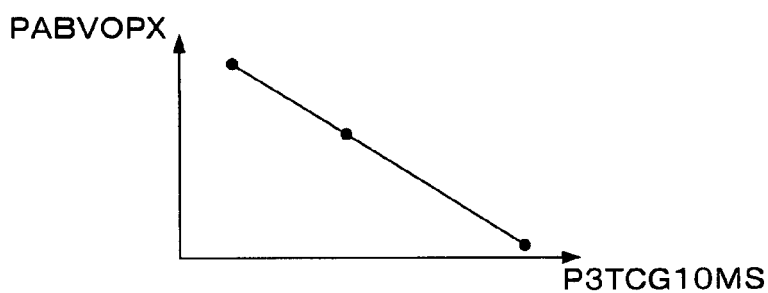
FIG. 7 shows a table referred to in the process of FIG. 6.

In step S33, a PABVOPX table shown in FIG. 7 is retrieved according to the pressure difference P3TCG10MS to calculate a determination pressure PABVOPX. In step S34, it is determined whether a value obtained by subtracting the intake pressure PBA from the boost pressure P3TC is greater than the determination pressure PABVOPX. If the answer to step S34 is affirmative (YES), it is determined whether the pressure difference P3TCG10MS is greater than a recirculation start pressure PABVCRCG (for example, 10.7 kPa (80 mmHg)) (step S35). If the answer to step S34 or S35 is negative (NO), it is determined that the air recirculation condition is not implemented, and the process proceeds to step S37.

In step S35, if P3TC10MS is greater than PABVCRCG, it is determined that the air recirculation condition is implemented and the recirculation condition flag FABVCRC is set to "1" (step S36).

Figure 8:
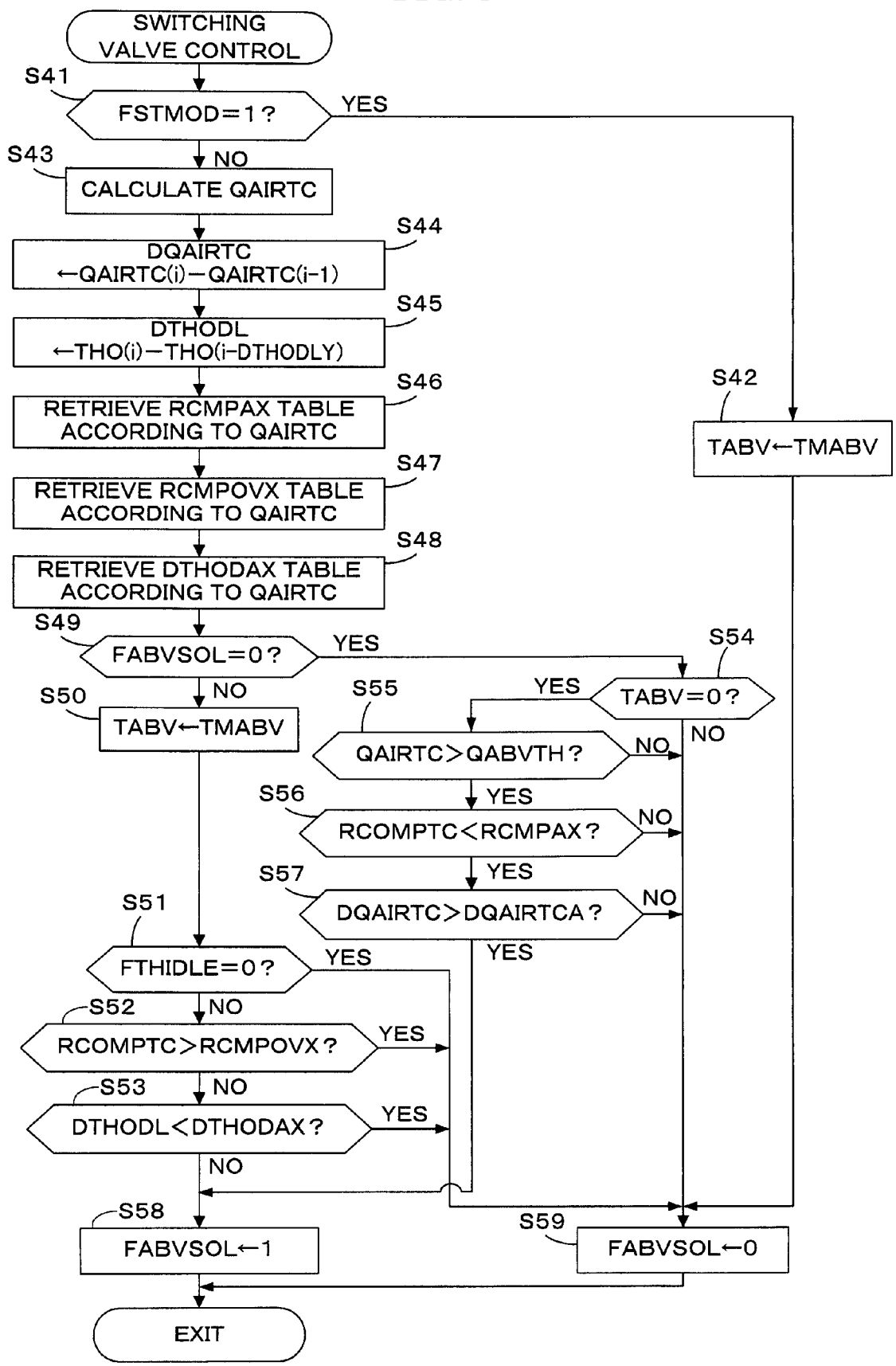
FIG. 8 is a flowchart of a process for controlling the switching valve which switches the pressure supplied to an air bypass valve.

FIG. 8 is a flowchart of a process for performing the switching control of the switching valve 8. The process is executed at predetermined time intervals (for example, 10 milliseconds) by the CPU in the ECU 21.

In step S41, it is determined whether a start mode flag FSTMOD is equal to "1". The start mode flag FSTMOD is set to "1" during starting (cranking) of the engine 1. If the answer to step S41 is affirmative (YES), a downcount timer TABV is set to a predetermined time TMABV (for example, 0.2 seconds) and started (step S42).

In step S41, if FSTMOD is equal to "0", a volume flow rate QAIRTC is calculated (step S43). The volume flow rate QAIRTC is obtained by converting the detected intake air flow rate VGAIRX [g/sec] to a volume flow rate.

In step S44, a flow rate change amount DQAIRTC is calculated by equation (5).

$$DQAIRTC = QAIRTC(i) - QAIRTC(i-1) \tag{5}$$

where i is a control time digitized with an execution period (10 milliseconds) of the process.

In step S45, a throttle valve opening change amount DTHODL is calculated by equation (6).

$$DTHODL = THO(i) - THO(i - DTHODLY) \tag{6}$$

where DTHODLY is a predetermined value set to, for example, "5".

Figure 9A:
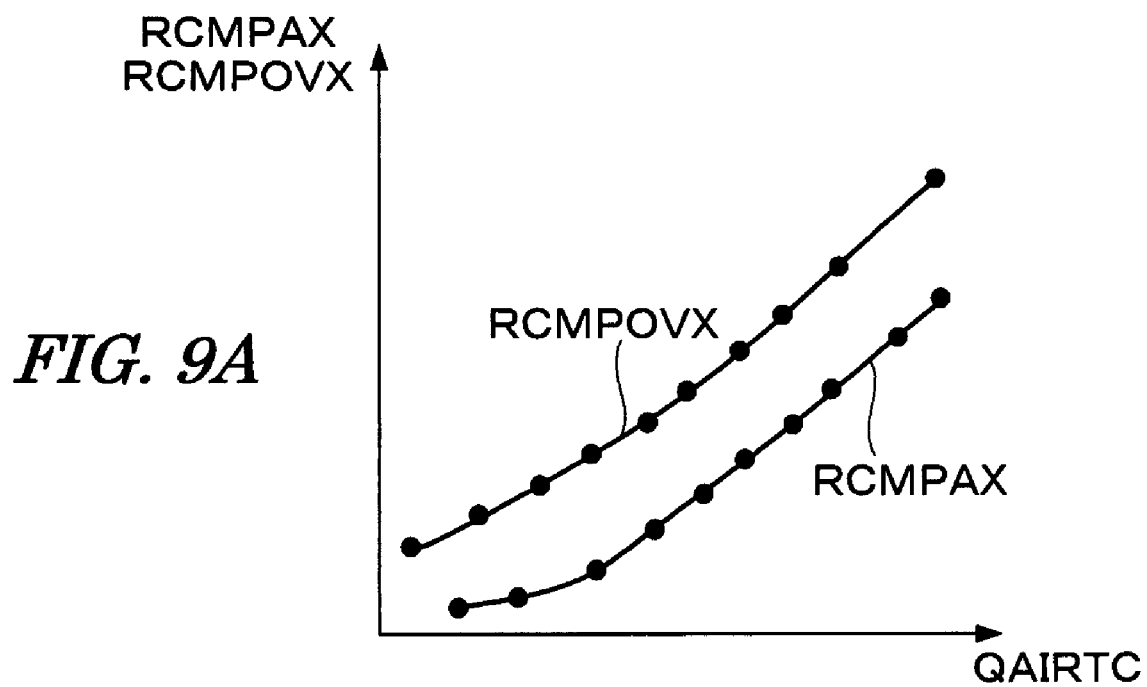
FIGS. 9A and 9B show tables referred to in the process of FIG. 8.
Figure 9B:
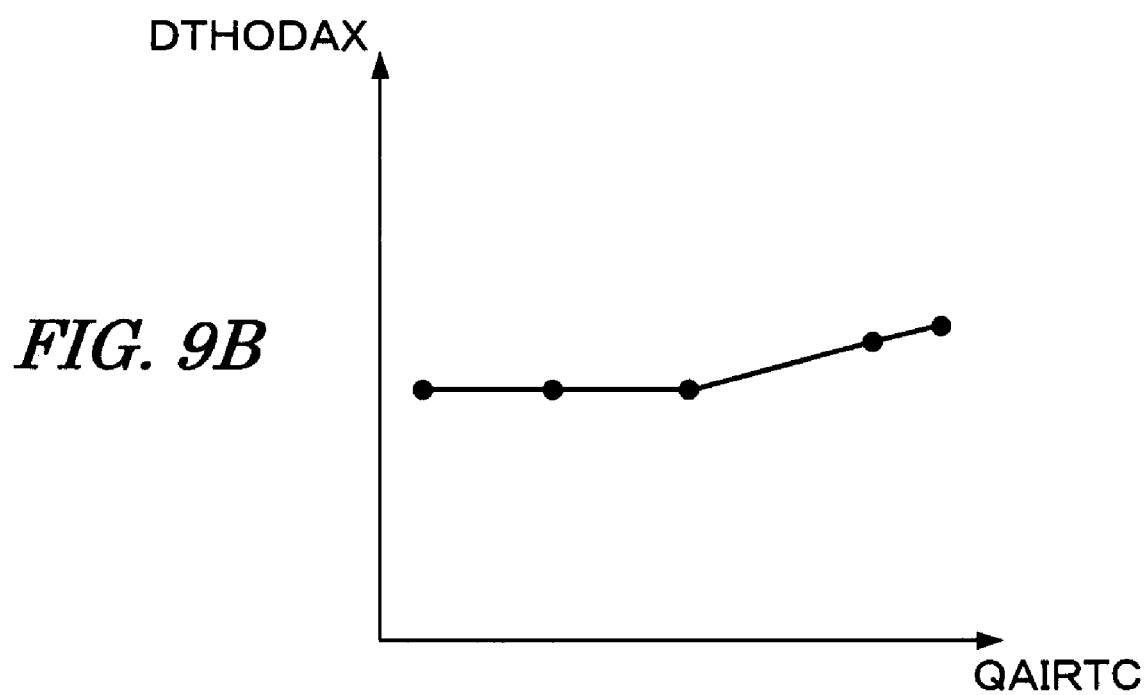

In step S46, a RCMPAX table shown in FIG. 9A is retrieved according to the volume flow rate QAIRTC to calculate a lower pressure ratio threshold value RCMPAX. In step S47, a RCMPOVX table shown in FIG. 9A is retrieved according to the volume flow rate QAIRTC to calculate an upper pressure ratio threshold value RCMPOVX. In step S48, a DTHODAX table shown in FIG. 9B is retrieved according to the volume flow rate QAIRTC to calculate an opening change amount threshold value DTHODAX.

In step S49, it is determined whether the switching valve flag FABVSOL is equal to "0". If the answer to step S49 is negative (NO), indicating that the switching valve 8 is in the valve opening disabling condition, the down count timer TABV is set to the predetermined time TMABV and started (step S50). Subsequently, it is determined whether an idle flag FTHIDLE is equal to "0" (step S51). The idle flag FTHIDLE is set to "0" when the engine 1 is in the idling condition.

If the answer to step S51 is negative (NO), indicating that the engine 1 is not in the idling condition, it is determined whether a pressure ratio RCOMPTC is greater than the upper pressure ratio threshold value RCMPOVX (step S52).

The pressure ratio RCOMPTC is a ratio (P3TC/PA) of the boost pressure P3TC to the atmospheric pressure PA. However, since the boost pressure sensor 23 is disposed downstream of the intercooler 4 and the atmospheric pressure sensor 29 is disposed upstream of an air cleaner (not shown), it is preferable to calculate the pressure ratio RCOMPTC by equation (6A) using a pressure loss DPLI of the intercooler 24 and a pressure loss DPLA of the air cleaner. The pressure losses DPLI and DPLA are calculated with reference to pressure loss tables which are previously set according to the intake air flow rate VGAIRX. The pressure loss tables are set wherein the pressure loss increases as the intake air flow rate VGAIRX increases.

$$RCOMPTC=(P3TC+DPLI)/(PA-DPLA) \tag{6A}$$

If the answer to step S52 is negative (NO), it is determined whether the throttle valve opening change amount DTHODL is less than the opening change amount threshold value DTHODAX (step S53). If the answer to step S53 is negative (NO), indicating that the throttle valve opening THO is increasing, the process proceeds to step S58, in which the switching valve flag FABVSOL is set to "1" and the valve opening disabling condition of the switching valve 8 is maintained.

If the answer to any one of steps S51 to S53 is affirmative (YES), i.e., if the engine 1 is in the idling condition, the pressure ratio RCOMPTC exceeds the upper pressure ratio threshold value RMPOVX, or the throttle valve opening THO is decreasing or minimally increasing, the process proceeds to step S59 wherein the switching valve flag FABVSOL is set to "0" and the switching valve 8 is switched to the valve opening enabling condition.

In step S49, if FABVSOL is equal to "0", indicating that the switching valve 8 is in the valve opening enabling condition, it is determined whether the value of the timer TABV is equal to "0" (step S54). When the answer to step S54 is negative (NO), the process proceeds to step S59 wherein the valve opening enabling condition is maintained.

In step S54, if TABV is equal to "0", the process proceeds to step S55 wherein it is determined whether the volume flow rate QAIRTC is greater than a predetermined flow rate QABVTH (for example, 20 litter/sec). If the answer to step S55 is affirmative (YES), it is determined whether the pressure ratio RCOMPTC is less than the lower pressure ratio threshold value RCMPAX (step S56). If the answer to step S56 is affirmative (YES), it is determined whether the flow rate change amount DQAIRTC is greater than a predetermined change amount DQAIRTCA (for example, 5 litter/sec) (step S57). If the answer to step S57 is affirmative (YES), indicating that the volume flow rate QAIRTC is increasing, the process proceeds to step S58 wherein the switching valve 8 is switched to the valve opening disabling condition.

If the answer to any one of steps S55 to S57 is negative (NO), i.e., if the volume flow rate QAIRTC is equal to or less than the predetermined flow rate QABVTH, the pressure ratio RCOMPTC is equal to or greater than the lower pressure ratio threshold value RCMPAX, or the flow rate change amount DQAIRTC is equal to or less than the predetermined change amount DQAIRTCA, the process proceeds to step S59 wherein the valve opening enabling condition of the switching valve 8 is maintained.

Figure 10:
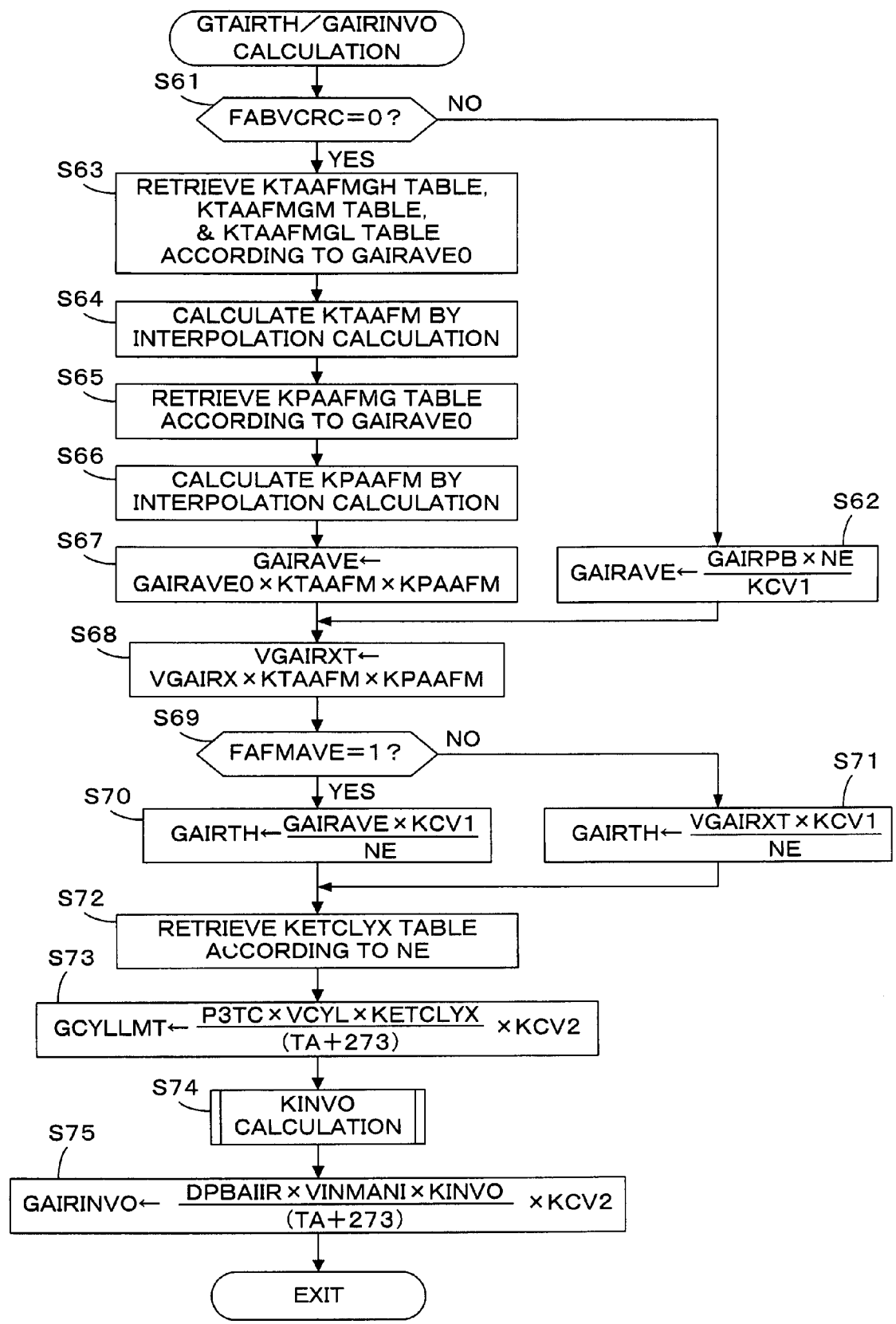
FIG. 10 is a flowchart of a process for calculating the throttle valve passing air flow rate (GAIRTH) and the intake pipe charging air flow rate (GAIRINVO)

FIG. 10 is a flowchart of a process for calculating a throttle valve passing air flow rate GAIRTH and an intake pipe charging air flow rate GAIRINVO. The process is executed by the CPU in the ECU 21 in synchronism with generation of the TDC pulse. The throttle valve passing air flow rate GARITH is a flow rate of air passing the throttle valve 5, and the intake pipe charging air flow rate GAIRINVO is a flow rate of air flowing into a region of the intake pipe 2 downstream of the throttle valve 5.

Figure 11A:
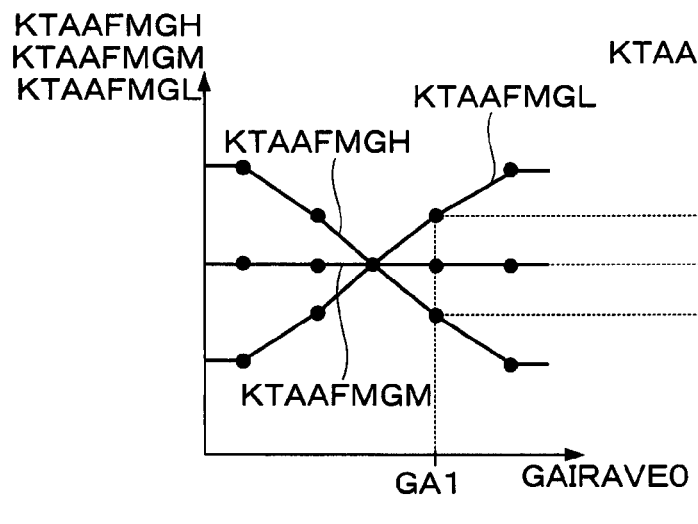
FIGS. 11A-11E show tables referred to in the process of FIG. 10.

In step S61, it is determined whether the recirculation condition flag FABVCRC is equal to "0". If the answer to step S61 is affirmative (YES), indicating that the air recirculation condition is not implemented, a KTAAFMGH table, a KTAAFMGM table, and a KTAAFMGL table, shown in FIG. 11A, are retrieved according to the averaged intake air flow rate GAIRAVE0 to calculate a first coefficient value KTAAFMGH, a second coefficient value KTAAFMGM, and a third coefficient value KTAAFMGL, respectively (step S63).

Figure 11B:
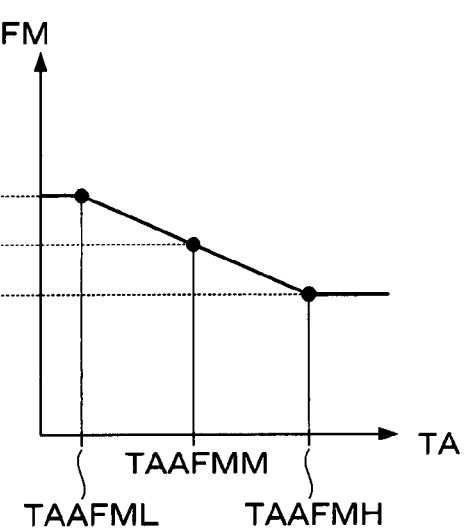

In step S64, an interpolation calculation (described below) is performed according to the intake air temperature TA to calculate an intake air temperature correction coefficient KTAAFM. For example, as shown in FIGS. 11A and 11B, when the averaged intake air flow rate GAIRAVE0 is equal to GA1, the intake air temperature correction coefficient KTAAFM is set to the third coefficient value KTAAFMGL if the intake air temperature TA is equal to or less than a first predetermined intake air temperature TAAFML (for example, −30° C.). If the intake air temperature TA is greater than the first predetermined intake air temperature TAAFML and equal to or less than a second predetermined intake air temperature TAAFMM (for example, 25° C.), the intake air temperature correction coefficient KTAAFM is set by the interpolation calculation to be between the second coefficient value KTAAFMGM and the third coefficient value KTAAFMGL. If the intake air temperature TA is greater than the second predetermined intake air temperature TAAFMM and equal to or less than a third predetermined intake air temperature TAAFMH (for example, 80° C.), the intake air temperature correction coefficient KTAAFM is set by the interpolation calculation to be between the second coefficient value KTAAFMGM and the first coefficient value KTAAFMGH. If the intake air temperature TA is greater than the third predetermined intake air temperature TAAFMH, the intake air temperature correction coefficient KTAAFM is set to the first coefficient value KTAAFMGH.

Figure 11C:
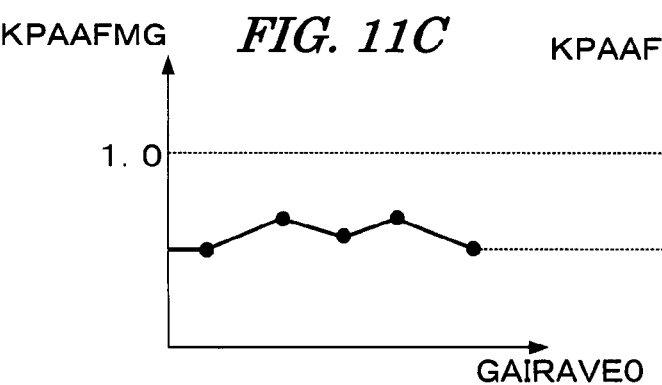
Figure 11D:
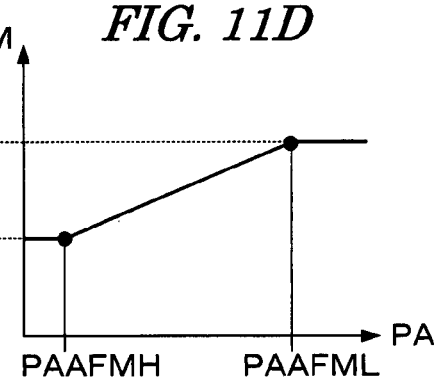

In step S65, a KPAAFMG table shown in FIG. 11C is retrieved according to the averaged intake air flow rate GAIRAVE0 to calculate a coefficient value KPAAFMG for high altitudes. In step S66, an interpolation calculation is performed according to the atmospheric pressure PA to calculate an atmospheric pressure correction coefficient KPAAFM. Specifically, as shown in FIG. 11D, if the atmospheric pressure PA is less than a first pressure value PAAFMH (for example, 60 kPa (450 mmHg)), the atmospheric pressure correction coefficient KPAAFM is set to the coefficient value KPAAFMG calculated in step S65. If the atmospheric pressure PA is greater than the first pressure value PAAFMH and equal to or less than a second pressure value PAAFML corresponding to the atmospheric pressure at altitude "0", the atmospheric pressure correction coefficient KPAAFM is set by the interpolation calculation to be between the coefficient value KPAAFMG and "1.0". If the atmospheric pressure PA is greater than the second pressure value PAAFML, the atmospheric pressure correction coefficient KPAAFM is set to "1.0."

In step S67, the averaged intake air flow rate GAIRAVE0 is corrected by equation (7) to calculate a corrected averaged intake air flow rate GAIRAVE.

$$GAIRAVE=GAIRAVE0 \times KTAAFM \times KPAAFM \tag{7}$$

On the other hand, if the answer to step S61 is negative (NO), indicating that the air recirculation condition is implemented, a corrected averaged intake air flow rate GAIRAVE is calculated by equation (8) (step S62).

$$GAIRAVE = GAIRPB \times NE/KCV1 \quad (8)$$

where GAIRPB is a cylinder intake air flow rate (hereinafter referred to as "PB intake air flow rate") calculated in the process of FIG. 12 according to the intake pressure PBA, and KCV1 is a conversion coefficient for matching the dimension.

In step S68, the detected intake air flow rate VGAIRX and the correction coefficients KTAAFM and KPAAFM are applied to equation (9) to calculate a corrected intake air flow rate VGAIRXT.

$$VGAIRXT = VGAIRX \times KTAAFM \times KPAAFM \quad (9)$$

In step S69, it is determined whether the transient determination flag FAFMAVE is equal to "1". If FAFMAVE is equal to "1", indicating that the engine operating condition is not in the transient state, the throttle valve passing air flow rate GAIRTH is calculated by equation (10) using the corrected averaged intake air flow rate GAIRAVE (step S70).

$$GAIRTH = GAIRAVE \times KCV1/NE \quad (10)$$

In step S69, if FAFMAVE is equal to "0", indicating that the engine operating condition is in the transient state, the throttle valve passing air flow rate GAIRTH is calculated by equation (11) using the corrected intake air flow rate VGAIRXT (step S71).

$$GAIRTH = VGAIRXT \times KCV1/NE \quad (11)$$

Figure 11E:
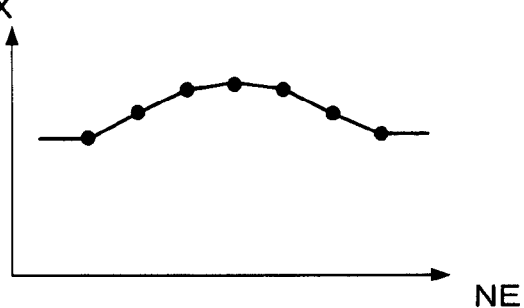

In step S72, a KETCLYX table shown in FIG. 11E is retrieved according to the engine rotational speed NE to calculate a rotational speed correction coefficient KETCLYX. In step S73, the boost pressure P3TC, the rotational speed correction coefficient KETCLYX, and the intake air temperature TA are applied to equation (12) to calculate a flow rate upper limit value GCYLLMT.

$$GCYLLMT = \frac{P3TC \times VCYL \times KETCYLX}{(TA+273)} \times KCV2 \quad (12)$$

where, VCYL is a cylinder volume and KCV2 is a conversion coefficient for matching the dimension.

Figure 12:
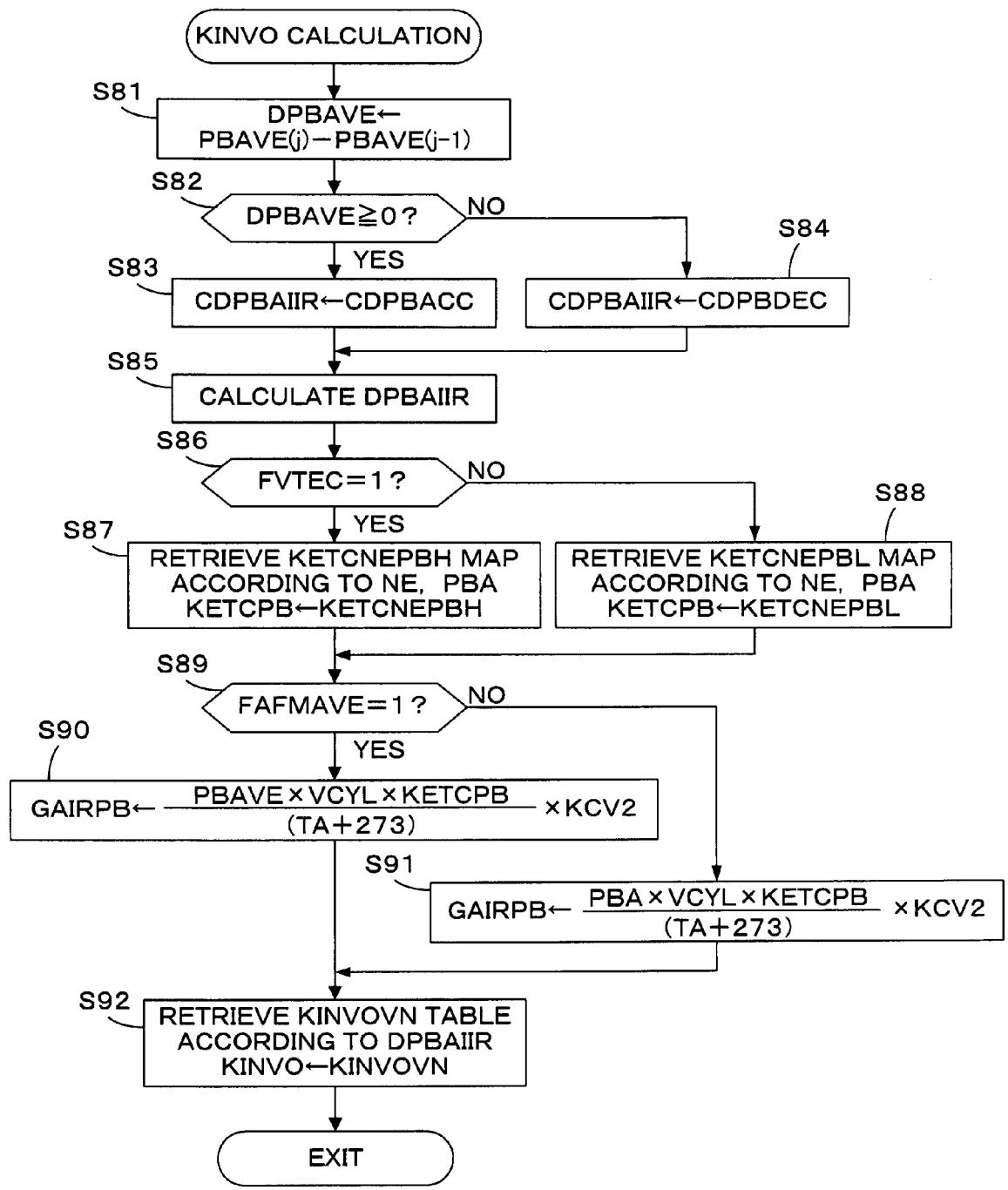
FIG. 12 is a flowchart of a process for calculating the correction coefficient (KINVO) used for calculating the intake pipe charging air flow rate.

In step S74, a KINVO calculation process shown in FIG. 12 is performed to calculate a modification coefficient KINVO. In step S75, a modified intake pressure change amount DPBAIIR, the modification coefficient KINVO calculated in the process of FIG. 12, and the intake air temperature TA, are applied to equation (13) to calculate an intake pipe charging air flow rate GAIRINVO.

$$GAIRINVO = \frac{DPBAIIR \times VINMANI \times KINVO}{(TA+273)} \times KCV2 \quad (13)$$

where, VINMANI is a volume of a portion of the intake pipe 2 downstream of the throttle valve 5.

Figure 13:
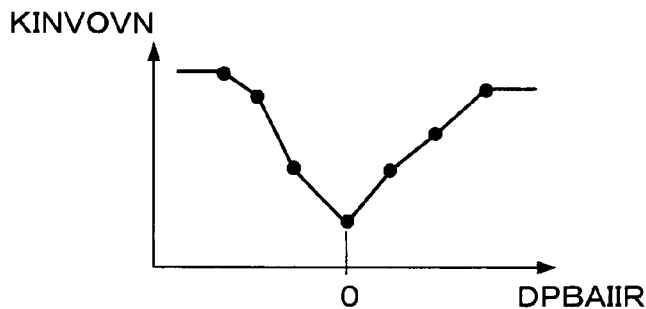
FIG. 13 shows a table referred to in the process of FIG. 12.

FIGS. 12 and 13 show a flowchart of the KINVO calculation process executed in step S74 of FIG. 10.

In step S81, an averaged intake pressure change amount DPBAVE is calculated by equation (14).

$$DPBAVE = PBAVE(j) - PBAVE(j-1) \quad (14)$$

where j is a control time digitized with a generating period of the CRK pulse.

In step S82, it is determined whether the averaged intake pressure change amount DPBAVE is equal to or greater than "0". If the answer to step S82 is affirmative (YES), indicating that the engine is accelerating or in a constant-speed operation, the averaging coefficient CDPBAIIR is set to an acceleration value CDPBACC (for example, 0.3) (step S83). If the answer to step S82 is negative (NO), indicating that the engine is decelerating, the averaging coefficient CDPBAIIR is set to a deceleration value CDPBDEC (for example, 0.4) (step S84).

In step S85, averaging coefficient CDPBAIIR and the averaged intake pressure change amount DPBAVE are applied to equation (15) to calculate the modified intake pressure change amount DPBAIIR.

$$DPBAIIR = CDPBAIIR \times DPBAVE$$

$$(1-CDPBAIIR) \times DPBAIIR \quad (15)$$

where DPBAIIR on the right side is the preceding calculated value.

In step S86, it is determined whether a valve timing flag FVTEC is equal to "1". The valve timing flag FVTEC is set to "1" when the opening and closing timings of the intake valves and the exhaust valves of the engine are set to the high-speed valve timing suitable for high-speed rotation of the engine, and set to "0" when the opening and closing timings of the intake valves and the exhaust valves of the engine are set to the low-speed valve timing suitable for low-speed rotation of the engine.

In step S86, if FVTEC is equal to "1", a KETCNEPBH map is retrieved according to the engine rotational speed NE and the intake pressure PBA to calculate a value KETCNEPBH for the high-speed rotation, and a modification coefficient KETCPB is set to the value KETCNEPBH for the high-speed rotation (step S87). If FVTEC is equal to "0", a KETCNEPBL map is retrieved according to the engine rotational speed NE and the intake pressure PBA to calculate a value KETCNEPBL for the low-speed rotation, and the modification coefficient KETCPB is set to the value KETCNEPBL for the low-speed rotation (step S88).

In step S89, it is determined whether the transient determination flag FAFMAVE is equal to "1". If FAFMAVE is equal to "1", indicating that the engine operating condition is not in the transient state, the PB intake air flow rate GAIRPB is calculated by equation (16) (step S90). If FAFMAVE is equal to "0", indicating that the engine operating condition is in the transient state, the PB intake air flow rate GAIRPB is calculated by equation (17) (step S91). In the transient state, calculation accuracy may decrease if the averaged intake pressure PBAVE is used. Therefore, the PB intake air flow rate GAIRPB is calculated using the detected intake pressure PBA.

$$GAIRPB = \frac{PBAVE \times VCYL \times KETCPB}{(TA+273)} \times KCV2 \quad (16)$$

$$GAIRPB = \frac{PBA \times VCYL \times KETCPB}{(TA+273)} \times KCV2 \quad (17)$$

In step S92, a KINVOVN table shown in FIG. 13 is retrieved according to the modified intake pressure change amount DPBAIIR to calculate a coefficient value KINVOVN, and the modification coefficient KINVO is set to the coefficient value KINVOVN.

Figure 14:
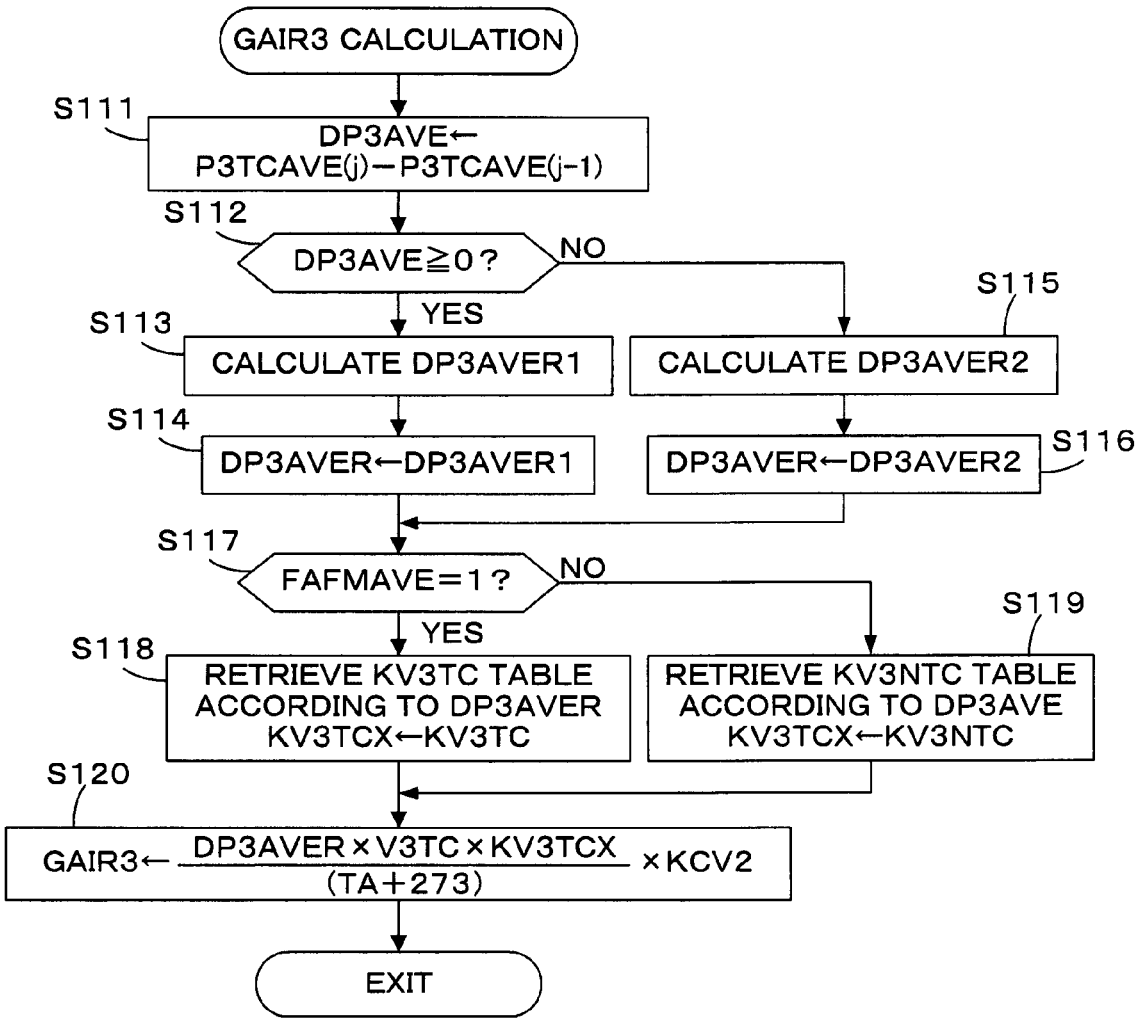
FIG. 14 is a flowchart of a process for calculating a pressurized air flow rate (GAIR3)

FIG. 14 is a flowchart of a process for calculating a flow rate GAIR3 (hereinafter referred to as "pressurized air flow rate") of air flowing into a region of the intake pipe 2 downstream of the intercooler 4 and upstream of the throttle valve 5. The process is executed by the CPU in the ECU 21 in synchronism with generation of the TDC pulse.

In step S11, an averaged boost pressure change amount DP3AVE is calculated by equation (19).

$$DP3AVE = P3TCAVE(j) - P3TCAVE(j-1) \quad (19)$$

In step S112, it is determined whether the averaged boost pressure change amount DP3AVE is equal to or greater than "0". If the answer to step S112 is affirmative (YES), indicating that the boost pressure P3TC is increasing or staying at a substantially constant level, the averaged boost pressure change amount DP3AVE is applied to equation (20) to calculate a first averaged value DP3AVER1 (step S113).

$$DP3AVER1 = \\ CDP3ACC \times DP3AVE + (1 - CDP3ACC) \times DP3AVER1 \quad (20)$$

where CDP3ACC is an averaging coefficient set to a value between "0" and "1", and DP3AVER1 on the right side is the preceding calculated value.

Next, a secondary averaged boost pressure change amount DP3AVER is set to the first averaged value DP3AVER1 (step S114). Thereafter, the process proceeds to step S117.

If the answer to step S112 is negative (NO), indicating that the boost pressure P3TC is decreasing, the averaged boost pressure change amount DP3AVE is applied to equation (21) to calculate a second averaged value DP3AVER2 (step S115).

$$DP3AVER2 = \\ CDP3DEC \times DP3AVE + (1 - CDP3DEC) \times DP3AVER2 \quad (21)$$

where CDP3DEC is an averaging coefficient set to a value between "0" and "1", and DP3AVER2 on the right side is the preceding calculated value.

Next, the secondary averaged boost pressure change amount DP3AVER is set to the second averaged value DP3AVER2 (step S116). Thereafter, the process proceeds to step S117.

In step S117, it is determined whether the transient determination flag FAFMAVE is equal to "1". If FAFMAVE is equal to "1", indicating that the engine operating condition is not in the transient state, the process proceeds to step S118, in which a KV3TC table shown in FIG. 15A is retrieved according to the secondary averaged boost pressure change amount DP3AVER to calculate a coefficient value KV3TC, and the modification coefficient KV3TCX is set to the coefficient value KV3TC. Thereafter, the process proceeds to step S120.

If FAMFAVE is equal to "0" in step S117, indicating that the engine operating condition is in the transient state, a KV3NTC table shown in FIG. 15B is retrieved according to the averaged boost pressure change amount DP3AVE to calculate a coefficient value KV3NTC, and the modification coefficient KV3TCX is set to the coefficient value KV3NTC (step S119). Thereafter, the process proceeds to step S120.

In step S120, the secondary averaged boost pressure change amount DP3AVER and the modification coefficient KV3TCX are applied to equation (22) to calculate the pressurized air flow rate GAIR3.

$$GAIR3 = \frac{DP3AVER \times V3TC \times KV3TCX}{(TA + 273)} \times KCV2 \quad (22)$$

where V3TC is a volume of the portion in the intake pipe 2 from the intercooler 4 to the throttle valve 5.

FIG. 16 is a flowchart of a process for calculating the cylinder intake air flow rate GAIRCYLN. The process is executed by the CPU in the ECU 21 in synchronism with generation of the TDC pulse.

In step S131, it is determined whether the recirculation condition flag FABVCRC is equal to "0". If FABVCRC is equal to "0", indicating that the recirculation condition is not implemented, the throttle valve passing air flow rate GAIRTH, the intake pipe charging air flow rate GAIRINVO, and the pressurized air flow rate GAIR3 are applied to equation (23) to calculate the cylinder intake air flow rate GAIRCYLN (step S132).

$$GAIRCYLN = GAIRTH - GAIRINVO - GAIR3 \quad (23)$$

By correcting the throttle valve passing air flow rate GAIRTH calculated according to the output of the intake air flow rate sensor 22 with the intake pipe charging air flow rate GAIRINVO and the pressurized air flow rate GAIR3, an accurate value of the cylinder intake air flow rate GAIRCYLN is obtained.

On the other hand, if FABVCRC is equal to "1", indicating that the air recirculation condition is implemented, the cylinder intake air flow rate GAIRCYLN is set to the PB intake air flow rate GAIRPB (step S133).

As described above, in this embodiment, when the air recirculation condition is not implemented, i.e., when the air is not recirculated through the air bypass valve 7, the cylinder intake air flow rate GAIRCYLN is calculated by subtracting the intake pipe charging air flow rate GAIRINVO and the pressurized air flow rate GAIR3 from the throttle valve passing air flow rate GAIRTH that is calculated according to the output of the intake air flow rate sensor 22. On the other hand, since the intake air flow rate sensor output VGAIR pulsates in the air recirculation state as described below, equation (23) does not provide an accurate value of the cylinder intake air flow rate GAIRCYLN. Therefore, the cylinder intake air flow rate GAIRCYLN is set to the PB intake air flow rate GAIRPB calculated by equation (16) or (17) (FIG. 12) according to the intake pressure PBA. This makes it possible to eliminate influencing pulsation of the intake air flow rate sensor output, and a more accurate value of the cylinder intake air flow rate GAIRCYLN is obtained. Therefore, by supplying an amount of fuel according to the cylinder intake air flow rate GAIRCYLN, the air-fuel ratio in the combustion chamber is appropriately controlled, and good exhaust characteristics are maintained.

FIGS. 17A-17F show time charts for illustrating a problem which occurs when the throttle valve 5 is rapidly closed when the compressor 3 is operating. FIGS. 17A-17F, respectively, show changes in the throttle valve opening THO, the recirculation condition flag FABVCRC, the boost pressure P3TC, the intake pressure PBA, the intake air flow rate sensor output VGAIR, the lift amount (opening) LABV of the air bypass valve 7, and the detected equivalent ratio KACT.

Figure 17:
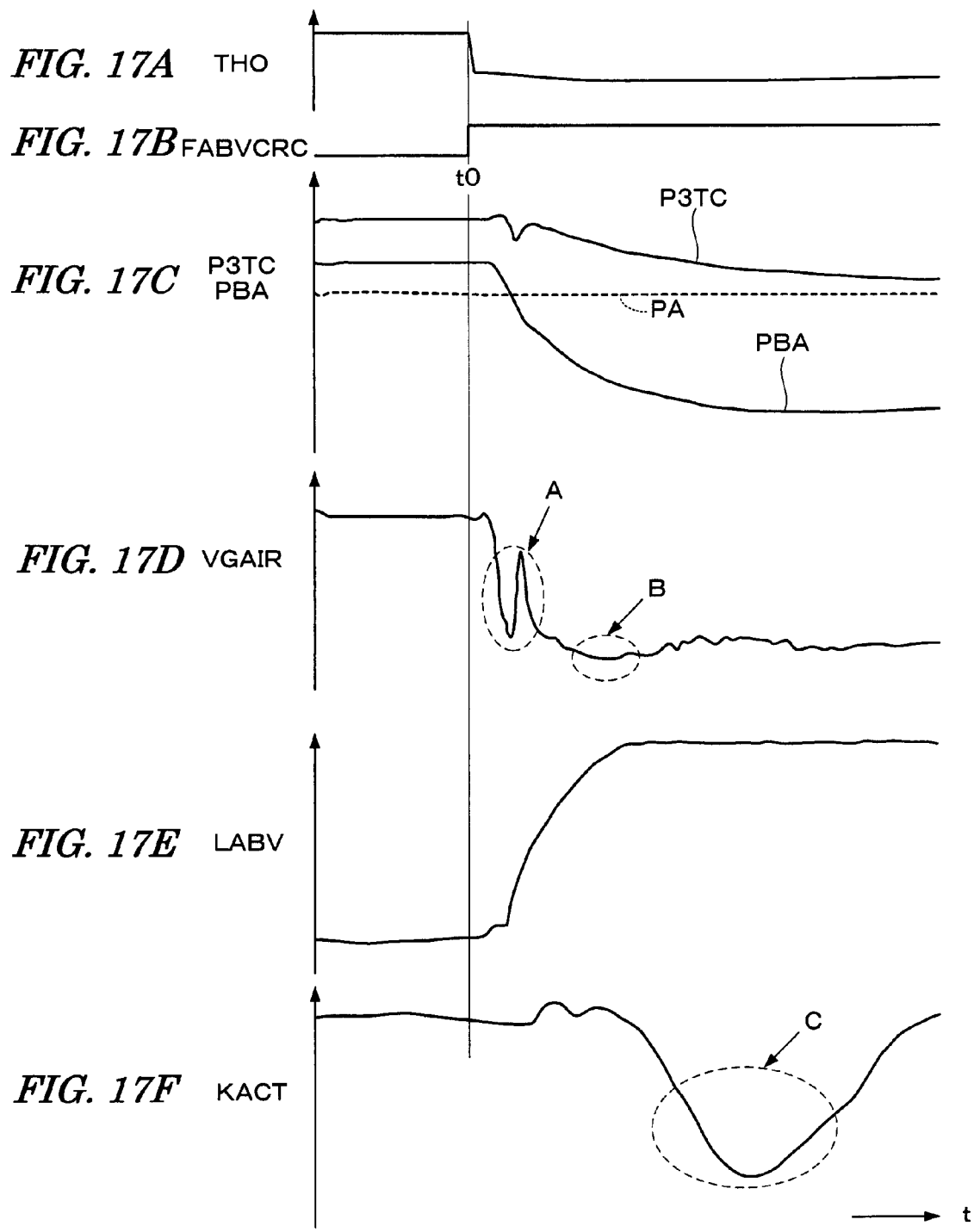
FIGS. 17A-17F are time charts illustrating that a problem occurs when the throttle valve is rapidly closed.

When the throttle valve 5 is closed at time t0 (FIG. 17A), the air flow in the intake pipe is interrupted by a water hammer, and the intake air flow rate sensor output VGAIR rapidly decreases. Thereafter, the interrupted air then flows in a burst, and the intake air flow rate sensor output VGAIR rapidly increases (FIG. 17D, Section A). Further, the switching valve 8 is controlled to the valve opening enabling condition by closing the throttle valve 5, and the lift amount LABV of the air bypass valve 7 gradually increases (FIG. 17E). With the increase in the lift amount LABV, the amount of air recirculated through the air bypass valve 7 increases, the air flow velocity decreases in the vicinity of the intake air amount sensor 22, and the sensor output VGAIR indicates a value lower than the actual intake air flow rate (FIG. 17D, Section B). Consequently, the air-fuel ratio in the combustion chamber becomes over lean (FIG. 17F, C section). Thereafter, the amount of recirculated air decreases, and the air-fuel ratio gradually returns to the stoichiometric ratio.

In this embodiment, if the recirculation condition flag FABVCRC (FIG. 17B) is set to "1", the cylinder intake air flow rate GAIRCYLN is switched to the PB intake air flow rate GAIRPB (FIG. 16). As shown in FIG. 17C, the intake pressure PBA smoothly decreases without being influenced by the water hammer. Accordingly, the PB intake air flow rate GAIRPB calculated based on the intake pressure PBA also decreases smoothly. Therefore, the over lean condition of the air-fuel ratio, as shown in FIG. 17F, is prevented from occurring and good exhaust characteristics are maintained.

In this embodiment, the boost pressure sensor 23, the intake pressure sensor 24, the atmospheric pressure sensor 29, and the intake air flow rate sensor 22, respectively, constitute the boost pressure detecting means, the intake pressure detecting means, the atmospheric pressure detecting means, and the intake air flow rate detecting means. The crank angle position sensor 26 constitutes the rotational speed detecting means, and the ECU 21 constitutes the intake air flow rate estimating means and the fuel amount control means. Specifically, the processes of FIGS. 3, 5, 6, 8, 10, 12, 14, and 16 correspond to the intake air flow rate estimating means, and the calculation of the fuel injection period TOUT using equation (1) corresponds to the fuel amount control means.

The present invention is not limited to the embodiment described above, and various modifications may be made. For example, in the embodiment described above, the cylinder intake air flow rate GAIRCYLN is calculated during normal control by correcting the detected intake air flow rate VGAIRX calculated according to the intake air flow rate sensor output VGAIR with the intake pipe charging air flow rate GAIRINVO and the pressurized air flow rate GAIR3. Alternatively, the present invention is also applicable to a control system which does not perform such correction with the intake pipe charging air flow rate GAIRINVO and the pressurized air flow rate GAIR3.

Further, in step S45 of FIG. 8, the throttle valve opening change amount DTHODL is calculated and applied to the determination in step S53. Alternatively, the throttle valve opening area ratio change amount DRTHODL may be used instead of the throttle valve opening change amount DTHODL. The use of DRTHODL contributes to improving control accuracy. It is to be noted that the threshold value DTHODAX applied in step S53 should be set to "−5%" (constant value) when using the throttle valve opening area ratio change amount DRTHODL.

Figure 18:
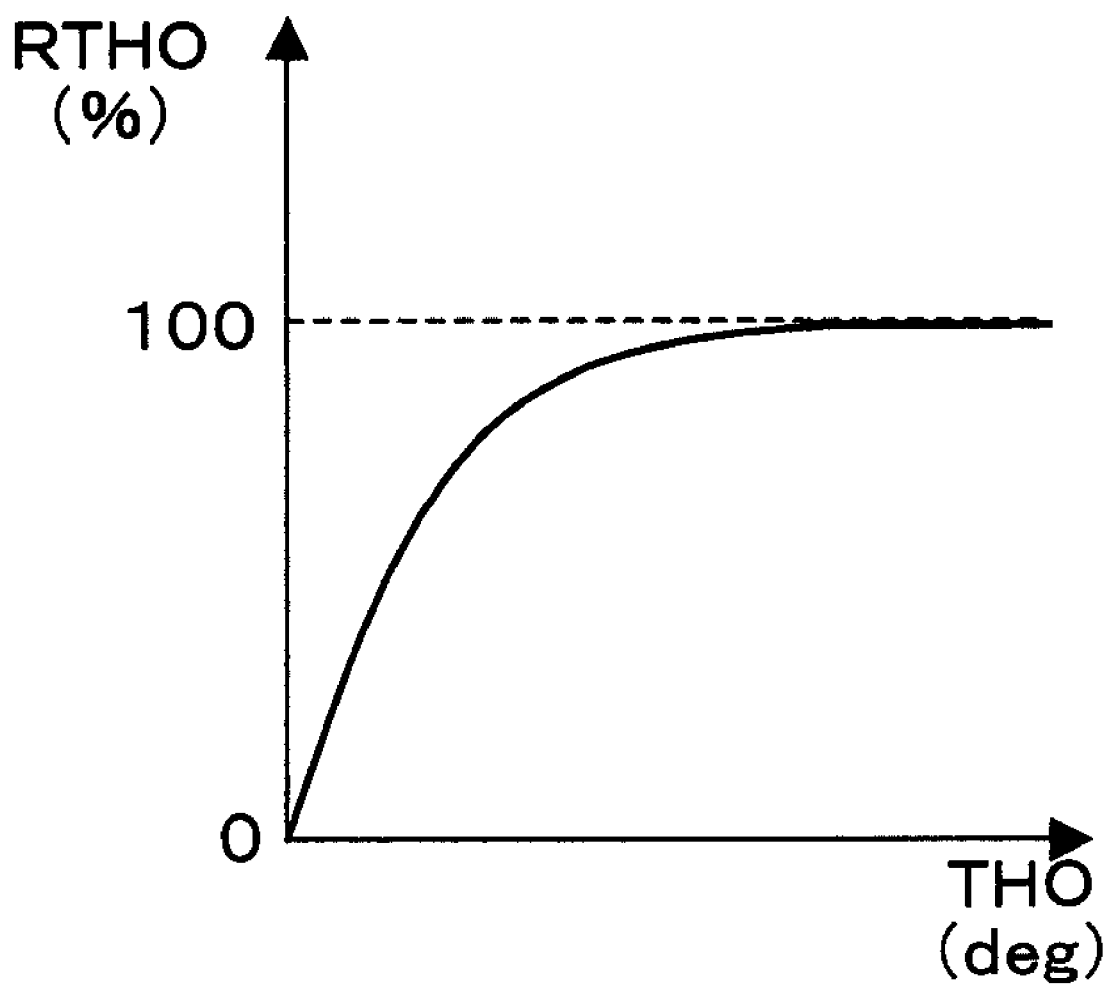
FIG. 18 shows a table for changing the throttle valve opening (THO) to the opening area ratio (RTHO) of the throttle valve.

The throttle valve opening area ratio change amount DRTHODL is calculated by equation (23).

$$DRTHODL = RTHO(i) - RTHO(i - DRTHODLY) \qquad (23)$$

where RTHO is an opening area ratio of the throttle valve 5 and is calculated by retrieving an RTHO table shown in FIG. 18 according to the throttle valve opening THO. Further, DRTHODLY is a predetermined value, for example, set to "5".

The present invention can be applied also to a fuel supply control for a watercraft propulsion engine, such as an outboard engine having a vertically extending crankshaft.

The present invention may be embodied in other specific forms without departing from the spirit or essential characteristics thereof. The above-disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. A fuel control system for an internal combustion engine having an intake passage, a compressor provided in said intake passage, a throttle valve disposed downstream of said compressor, a bypass passage connecting an upstream side of said compressor to a downstream side of said compressor, and an air bypass valve provided in said bypass passage, said fuel control system comprising:
   intake pressure detection means for detecting an intake pressure on a downstream side of said throttle valve;
   rotational speed detecting means for detecting a rotational speed of said engine;
   opening operation state determining means for determining an opening operation state of said air bypass valve;
   intake air flow rate calculating means for calculating an intake air flow rate of said engine based on the rotational speed of said engine and the intake pressure, which are detected when said air bypass valve is in the opening operation state; and
   fuel amount control means for controlling an amount of fuel supplied to said engine according to the calculated intake air flow rate.

2. A fuel control system according to claim 1, wherein said opening operation state determining means comprises:
   boost pressure detecting means for detecting a boost pressure on the downstream side of said compressor; and
   atmospheric pressure detecting means for detecting an atmospheric pressure,
   wherein said opening operation state determining means determines that said air bypass valve is in the opening operation state when said air bypass valve is in a condition of being able to open, and a pressure difference between the boost pressure and the atmospheric pressure is equal to or greater than a predetermined pressure.

3. A fuel control system according to claim 1, further comprising air flow rate detecting means for detecting an intake air flow rate on the upstream side of a connecting portion where said bypass passage connects with said intake passage on the upstream side of said compressor, wherein said intake air flow rate calculating means calculates the intake air flow rate of said engine according to the intake air flow rate detected by said intake air flow rate detecting means when said air bypass valve is not in the opening operation state.

4. A fuel control system according to claim 3, wherein when the air bypass valve is not in the opening operation state, the intake air flow rate calculating means calculates a first correction air flow rate and a second correction air flow rate and corrects the intake air flow rate detected by said intake air flow rate detecting means with the first and second correction air flow rates to calculate the intake air flow rate of the engine, and wherein the first correction air flow rate is a flow rate of air flowing into a region in said intake passage downstream of the compressor and upstream of the throttle valve, and the second correction air flow rate is a flow rate of air flowing into a region in the intake passage downstream of the throttle valve.

5. A fuel control system according to claim 1, further comprising:
   transient state determining means for determining a transient sate of said engine,
   wherein said intake air flow rate calculating means uses the detected intake pressure when said engine is determined to be in the transient state, and
   wherein said intake air flow rate calculating means uses an averaged intake pressure calculated by averaging the detected intake pressure when said engine is not determined to be in the transient state.

6. A fuel control system according to claim 5, wherein said transient state determining means comprises:
   intake pressure change amount calculating means for calculating an intake pressure change amount which is a change amount of the detected intake pressure; and
   second order intake pressure change amount calculating means for calculating a second order change amount which is a change amount of the intake pressure change amount,
   wherein said transient state determining means performs the transient state determination by comparing the intake pressure change amount and the second order intake pressure change amount, respectively, with corresponding determination threshold values.

7. A fuel control method for an internal combustion engine having an intake passage, a compressor provided in said intake passage, a throttle valve disposed downstream of said compressor, a bypass passage connecting an upstream side of said compressor to a downstream side of said compressor, and an air bypass valve provided in said bypass passage, said fuel control method comprising the steps of:
   a) detecting an intake pressure on a downstream side of said throttle valve;
   b) detecting a rotational speed of said engine;
   c) determining an opening operation state of said air bypass valve;
   d) calculating an intake air flow rate of said engine based on the rotational speed of said engine and the intake pressure, which are detected when said air bypass valve is in the opening operation state; and
   e) controlling an amount of fuel supplied to said engine according to the calculated intake air flow rate.

8. A fuel control method according to claim 7, wherein said step c) includes the steps of:
   i) detecting a boost pressure on the downstream side of said compressor; and
   ii) detecting an atmospheric pressure,
   wherein said air bypass valve is determined to be in the opening operation state when said air bypass valve is in a condition of being able to open, and a pressure difference between the boost pressure and the atmospheric pressure is equal to or greater than a predetermined pressure.

9. A fuel control method according to claim 7, further comprising the step of:
   f) detecting an intake air flow rate on the upstream side of a connecting portion where said bypass passage connects with said intake passage on the upstream side of said compressor,
   wherein the intake air flow rate of said engine is calculated according to the detected intake air flow rate when said air bypass valve is not in the opening operation state.

10. A fuel control method according to claim 9, wherein said step d) includes the steps of:
    i) calculating a first correction air flow rate and a second correction air flow rate when the air bypass valve is not in the opening operation state; and
    ii) correcting the detected intake air flow rate detected with the first and second correction air flow rates to calculate the intake air flow rate of the engine,
    wherein the first correction air flow rate is a flow rate of air flowing into a region in said intake passage downstream of the compressor and upstream of the throttle valve, and the second correction air flow rate is a flow rate of air flowing into a region in the intake passage downstream of the throttle valve.

11. A fuel control method according to claim 7, further including the step of:
    g) determining a transient state of said engine,
    wherein the detected intake pressure is used in said step d) when said engine is determined to be in the transient state, and an averaged intake pressure calculated by averaging the detected intake pressure is used in said step d) when said engine is not determined to be in the transient state.

12. A fuel control method according to claim 11, wherein said step g) includes the steps of:
    i) calculating an intake pressure change amount which is a change amount of the detected intake pressure; and
    ii) calculating a second order change amount which is a change amount of the intake pressure change amount,
    wherein the transient state determination is performed by comparing the intake pressure change amount and the second order intake pressure change amount, respectively, with corresponding determination threshold values.

* * * * *